United States Patent
Monteiro Veras et al.

(10) Patent No.: US 12,541,869 B2
(45) Date of Patent: Feb. 3, 2026

(54) GRAIN FLAKE MEASUREMENT SYSTEM, GRAIN FLAKE MEASUREMENT METHOD, AND GRAIN FLAKE COLLECTION, MOVEMENT, AND MEASUREMENT SYSTEM

(71) Applicant: Bunge SA, Geneva (CH)

(72) Inventors: Rafael Monteiro Veras, Florianópolis—SC (BR); Artur Antonio Seibert, Florianópolis—SC (BR); André Luís Molgaro, Florianópolis—SC (BR); Flávio Gabriel Oliveira Barbosa, Florianópolis—SC (BR); Carlos Fernando Oliveira Cabeça Neves, Florianópolis—SC (BR); Renan Bonnard, Florianópolis—SC (BR)

(73) Assignee: BUNGE SA, Geneva (CH)

( * ) Notice: Subject to any disclaimer, the term of this patent is extended or adjusted under 35 U.S.C. 154(b) by 348 days.

(21) Appl. No.: 18/278,568

(22) PCT Filed: Feb. 23, 2022

(86) PCT No.: PCT/BR2022/050056
§ 371 (c)(1),
(2) Date: Aug. 23, 2023

(87) PCT Pub. No.: WO2022/178608
PCT Pub. Date: Sep. 1, 2022

(65) Prior Publication Data
US 2024/0233159 A1    Jul. 11, 2024

(30) Foreign Application Priority Data
Feb. 23, 2021  (BR) .......................... 102021003362-2

(51) Int. Cl.
*G06T 7/60*    (2017.01)
*G01N 1/14*    (2006.01)
(Continued)

(52) U.S. Cl.
CPC ................. *G06T 7/60* (2013.01); *G01N 1/14* (2013.01); *G06T 7/11* (2017.01); *G06T 7/12* (2017.01);
(Continued)

(58) Field of Classification Search
CPC ...................... G01B 11/06; G06T 2207/30188
See application file for complete search history.

(56) References Cited

U.S. PATENT DOCUMENTS

| | | | | |
|---|---|---|---|---|
| 6,061,130 A | * | 5/2000 | Plate | G01N 15/0227 356/335 |
| 6,437,784 B1 | * | 8/2002 | Bentley | G06T 19/20 345/473 |
| 2024/0233159 A1 | * | 7/2024 | Monteiro Veras | G06T 7/60 |

FOREIGN PATENT DOCUMENTS

| | | | | |
|---|---|---|---|---|
| BR | 102021003362 B1 | * | 11/2021 | G01N 1/14 |
| CA | 2559616 A1 | * | 3/2007 | G01B 11/0691 |

(Continued)

*Primary Examiner* — Gandhi Thirugnanam
(74) *Attorney, Agent, or Firm* — GrowIP Law Group LLC (57) ABSTRACT

This invention describes a measurement system (100), a measurement method, and a collection, movement, and measurement system for grains (200) run through a flaking process, in order to define the grain flake thickness. The grain flake measurement system comprises: an image collection device (110) configured to collect an image of one of the grain flakes; and an acquisition unit (120) configured to receive the of the collected grain flake image through the image collection device and perform a measurement of the grain flake thickness. The grain flake measurement method comprises the steps of: collecting (560) a grain flake image through an image collection device; and measuring (561) the (Continued)

grain flake thickness through the collected image. The grain flake collection, movement, and measurement system (200) comprises: a grain flake collection device (210); a measurement device (130); a movement and selection device (220); an acquisition unit (120); and a command unit (230).

15 Claims, 3 Drawing Sheets (51) Int. Cl.
 *G06T 7/11* (2017.01)
 *G06T 7/12* (2017.01)
(52) U.S. Cl.
 CPC ............... *G01N 2001/1418* (2013.01); *G06T 2207/10024* (2013.01); *G06T 2207/30188* (2013.01)

(56) References Cited

FOREIGN PATENT DOCUMENTS

| | | | | | |
|---|---|---|---|---|---|
| CN | 107860316 | A | * | 3/2018 | ........... G01B 11/022 |
| CN | 109308707 | A | * | 2/2019 | ............... G06T 7/13 |
| CN | 111260717 | A | * | 6/2020 | ........... G06T 7/0002 |
| CN | 111882621 | A | * | 11/2020 | ............. G06F 18/22 |
| CN | 112222015 | A | | 1/2021 | |
| CN | 113129281 | A | * | 7/2021 | ............. G06N 3/045 |
| CN | 119273626 | A | * | 1/2025 | ............. G06N 3/084 |
| CN | 119516535 | A | * | 2/2025 | ............. G06N 3/082 |

\* cited by examiner

GRAIN FLAKE MEASUREMENT SYSTEM, GRAIN FLAKE MEASUREMENT METHOD, AND GRAIN FLAKE COLLECTION, MOVEMENT, AND MEASUREMENT SYSTEM

CROSS-REFERENCE TO RELATED APPLICATIONS

This application is a U.S. National Stage Application of International PCT Application No. PCT/BR2022/050056, filed on Feb. 23, 2022, that claims priority to Brazilian Application No. BR102021003362-2, filed on Feb. 23, 2021, the entireties of which are hereby incorporated by reference.

This invention refers to a measurement system, a measurement method, and a collection, movement, and a measurement system for grains run through a flaking process, in order to define the grain flake thickness.

BACKGROUND ART

The methods for measuring a grain flake, for example, soybean flakes, that are widely known and used at the prior art, involve a non-automated measurement of the grains. This non-automated measurement method requires the practical training and development of qualified workers skilled in obtaining information from the measured matter, in this case, grain flakes. This need leads to dependence on a skilled worker who is trained and qualified to handle this job. Furthermore, human errors associated with measurements, process slowdowns, and possible non-measurements increase the inefficiency of non-automated methods, causing losses to the industry.

In order to enhance efficiency and lessen possible human errors, several types of equipment have been developed at the prior art. An example of a device at the prior art, more specifically a device for defining particle size, is described in document BR 112012011440-9. This document describes a process and a device for determining particle size distribution and a unit for sampling a product stream diverted from a flow line. A formation step is described for data measured through the detection of at least one portion of the particles, wherein the measurement data are generated by at least optical detection of part of the particles through at least two different optical measurement methods.

Another example of a device at the prior art is described in US Patent U.S. Pat. No. 6,061,130. This document describes a device for defining particle size distribution and characterizing the particle forms of a particle mixture. The device has a measurement apparatus for classifying a particle mixture in the flow of particles to the device. An opto-electronic measurement section is described, which has a light source and a device for collecting images aligned with each other, wherein the particle flow is steered between the light source and the image collection device. The image collection device has a plurality of electro-optical image recording units directed towards the particle flow and with different image recording scales combined among themselves in order to cover the entire device measurement range.

However, the processes and devices at the prior art do not describe a grain flake measurement system, a grain flake measurement method, or a grain flake collection, movement, and measurement system that collects grain flake images and performs a color segmentation process of the images collected by the image collection device, together with a binary image edge segment topological structural analysis. Consequently, the grain flake thickness measurement may not be measured in an efficient and accurate manner.

Documents constituting the prior art also make no mention of the use of a comparison of the number of pixels of the grain flake thickness with a pixel by millimeter ratio, or the use of a discard measurement range and a calculation measurement range for calculating a mean grain flake thickness value.

PURPOSES OF THE INVENTION

In view of the problems described at the prior art, the purpose of this invention is to provide the grain flake measurement system, a grain flake measurement method, and a grain flake collection, movement, and measurement system able to perform the grain flake measurement, based on segmentation by collected image colors through the image collection device, together with a binary image edge segment topological structural analysis.

The grain flake measurement proposed by the systems and method addressed by this invention results in more accurate and efficient grain flake measurements, such as soybean flakes, for example, in addition to being performed in an automated manner.

BRIEF DESCRIPTION OF THE INVENTION

This invention describes the grain flake measurement system that comprises: an image collection device and an acquisition unit. The image collection device is configured to collect an image of one of the grain flakes. The acquisition unit is configured to receive the grain flake image collected through the image collection device and perform a measurement of the grain flake thickness, based on a color segmentation and a binary image edge segment topological structural analysis of the collected image. The color segmentation of the collected grain flake thickness image may be a color segmentation in the HSV space.

The grain flake measurement system may also comprise one measurement point where the grain flake is positioned when the image collection device collects the grain flake image, wherein the image collection device and the measurement point are aligned in a manner that prevents confusion between the upper surface of the lower surface of the grain flake, as part of the grain flake thickness to be measured.

The acquisition unit may be configured to obtain a pixel per millimeter ratio of the image to be collected by the image collection device. The acquisition unit may also be configured to obtain a number of grain flake thickness pixels at all points forming a grain flake contour through the upper surface and the lower surface of the grain flake. The acquisition unit may be configured to compare the number of grain flake thickness pixels with the pixel per millimeter ratio and define the grain flake thickness over its entire surface profile This invention also describes a grain flake measurement method that comprises the steps of: collecting an image of one of the grain flakes through an image collection device; and measuring the grain flake thickness through the collected image. A step of measuring the grain flake thickness is performed by a color segmentation process and a binary image edge segment topological structural analysis of the image of the collected grain flake. The color segmentation of the collected grain flake image may be a color segmentation in the HSV space.

A step of aligning the image collection device with a measurement point in a manner that avoids an upper surface and a lower surface of the grain flake being misconstrued as part of the grain flake thickness to be measured.

The grain flake measurement method may also comprise a step of obtaining a pixel per millimeter ratio of the image to be collected by the image collection device. The grain flake measurement method may also comprise a step of obtaining a number of grain flake thickness pixels at all points forming a grain flake contour through the upper surface and lower surface of the grain flake. The grain flake measurement method may also comprise a step of comparing the number of grain flake thickness pixels with the pixel per millimeter ratio and defining the grain flake thickness over its entire surface profile The grain flake measurement method may comprise a step of measuring a discard measurement range and a calculation measurement range wherein the discard measurement range is defined based on an extremity of the grain flake profile surface, and the calculation measurement range is defined through the discard measurement range. The length of the discard measurement range may be between 5% and 15% of the longitudinal length of the flake profile surface, and the length of the calculation measurement range may be between 15% and 35% of the longitudinal length of the flake profile surface. The grain flake measurement method may also comprise a step of calculating a mean grain flake thickness value, wherein the mean value is a mean of the values obtained for different calculation measurement ranges.

This invention also describes a grain flake collection, movement, and measurement system that comprises a grain flake collection device, a measurement device, a movement and selection device, an acquisition unit, and a command unit.

The grain flake collection device comprises at least one valve configured to remove a grain flake from an external flow of grain flakes. The measurement device comprises an image collection device configured to collect a grain flake image for analysis. The movement and selection device is configured to take the grain flakes from the collection device and position the grain flakes at a measurement point. The collected acquisition unit is configured to receive the collected grain flake image through the measurement device and perform a measurement of the grain flake thickness. The command unit is connected to the grain flake collection device, the movement and selection device and the acquisition unit in a manner whereby it controls them.

In the grain flake collection, movement, and measurement system, a grain flake thickness measurement may be performed based on a color segmentation in the HSV space and a binary image edge segment topological structural analysis of the image of the plurality of grains collected.

The grain flake collection device may comprise a set of piping with asymmetrical valves configured to direct the external flow of grain flakes to the grain flake collection, movement, and measurement system. The movement and selection device may comprise a vacuum valve, a suction cup, a pneumatic linear actuator, and an axle, wherein the vacuum valve and the suction cup are configured to take the grain flakes, and the pneumatic linear actuator moves the vacuum valve and the suction cup along the axle, with the assistance of a linear guide.

BRIEF DESCRIPTION OF THE DRAWINGS

This invention will be described in greater detail below, based on an example of its embodiment, shown in the drawings. The Figures display.

DETAILED DESCRIPTION OF THE DRAWINGS

Figure 1:
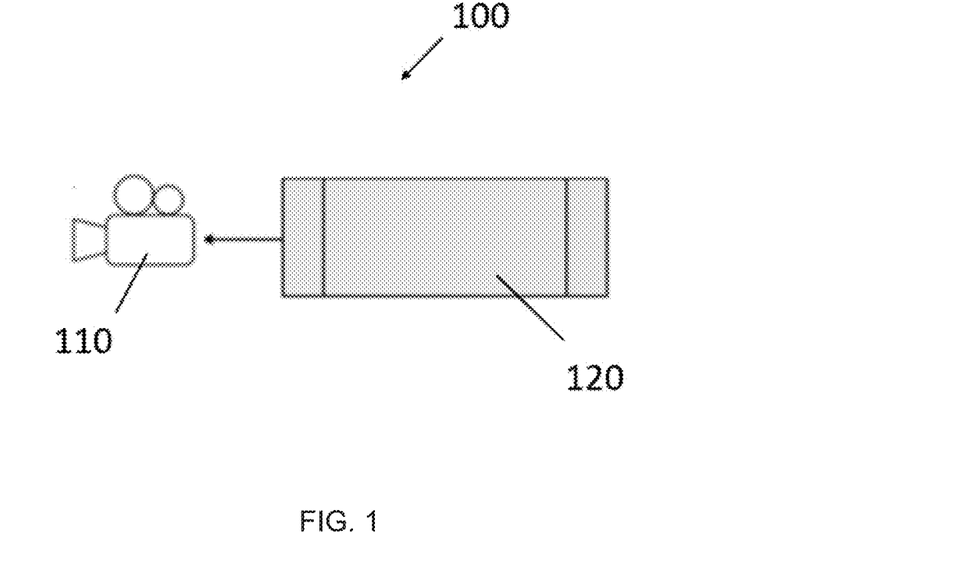
FIG. 1—is a schematic diagram of an embodiment of the grain flake measurement system addressed by this invention.

FIG. 1 shows a schematic diagram of the grain flake measurement system 100 according to an embodiment of this invention. In this example of an embodiment, the grain flake measurement system 100 comprises an image collection device 110 and an acquisition unit 120.

The acquisition unit 120 and the image collection device 110 are connected in a manner whereby the acquisition unit 120 controls the operation of the image collection device 110 and the image collection device 110 sends information to the acquisition unit 120. This control is handled through a signal transmission which may be handled by remote or physical connections, not being limited to any specific signal transmission type.

The image collection device 110 is a remote sensing device or an optical instrument that can collect, store, and/or send images. In one embodiment addressed by this invention, the image collection device 110 handles the measurement of a grain flake, such as a soybean flake, for example, through collecting an image of the screen flake.

Consequently, the image collection device 110 is configured to collect a grain flake image and store and/or send the collected image to the acquisition unit 120 for processing. An example of an image collection device 110 is a camera that comprises a lens to capture the desired image and store such image internally and/or send such image to an external device, such as an acquisition unit 120, for example.

The acquisition unit 120 comprises elements that allow information to be received from other items of equipment, controlled or not by acquisition unit 120, processing the received information, analyzing the information through programmed instructions, and forwarding the information to other items of equipment, such as an information presentation device, for example.

The elements that might comprise the acquisition unit 120 include programmable logic controller (PLC), electronic boards, a relay card, and a power source, among others. The acquisition unit 120 also comprises a set of executable instructions controlling the acquisition, handling, control, redirection, and/or modification of the received information.

The combination of the image collection device 110, configured to collect a grain flake image, with the acquisition unit 120, configured to receive the collected grain flake image through the image collection device 110 in the grain flake measurement system 100, allows the collection of the grain flake image through the image collection device 110 and sending the collected image to the acquisition unit 120 for processing. Through the image received by the acquisition unit 120, the set of executable instructions of the acquisition unit 120 is configured to perform tasks programmed in the PLC in order to measure the grain flake.

In one embodiment addressed by this invention, the acquisition unit 120 performs the grain flake measurement, based on segmentation by collected image colors through the image collection device 110, together with the binary image edge segment topological structural analysis.

Color segmentation analysis is used by the acquisition unit 120 to encode the collected digital image. This may take place, in the HSV space, for example. Formed by the "Hue", "Saturation" and "Value" components respectively, the HSV color system defines the color space using these three parameters.

Performing color segmentation implies adapting to known parameters the colors obtained in the pixels that comprise the digital image, which in this case translates into separating what may be considered the grain flake from what may be considered the background of the image. The binary image edge segment topological structural analysis is a sequence of instructions performed by the acquisition unit 120 to define the grain flake contour. The combination of the color segmentation in the HSV space with the binary image edge segment topological structural analysis allows the acquisition unit 120 to extract the grain flake contour and the number of pixels occupied by the grain flake thickness.

Using a known area object to calibrate the grain flake measurement system 100 addressed by this invention, the acquisition unit 120 can obtain, through the image collection device 110, a pixel per milliliter ratio for the grain flake measurement system 100 addressed by this invention. The pixel per milliliter ratio obtained may be used to define the size of objects measured subsequent to calibration, based on the number of pixels occupied by the object.

Consequently, when collecting the grain flake image through the image collection device 110, the acquisition unit 120 can obtain a number of grain flake thickness pixels at all points forming a grain flake contour. By comparing compare the number of grain flake thickness pixels with the pixel per millimeter ratio, the acquisition device 120 can define the grain flake thickness over its entire surface profile In order to collect the grain flake image correctly, the grain flake measurement system 100 comprises a measurement point. The measurement point is the place where the grain flake is positioned so that the image collection device 110 can collect the grain flake image correctly. In order to ensure that the grain flake image allows accurate measurement of the grain flake thickness, the horizontal plane of the grain flake must be aligned with the image collection device 110. In other words, the image collection device 110 and the measurement point must be aligned in a manner that avoids an upper surface 310 and a lower surface 320 of the grain flake being misconstrued as part of the grain flake thickness to be measured. An upper surface 310 and a lower surface 320 of the grain flake 300 are presented in FIG. 2.

In one embodiment, the acquisition device 120 calculates the grain flake thickness measurement 300, based on a mean grain flake thickness value 300. The grain flake image 300 of this embodiment is exemplified in FIG. 2. To do so, the acquisition device 120 measures a discard measurement range 330 and a calculation measurement range 340. The discard measurement range 330 is a measurement used to define the start of the calculation measurement range 340. Consequently, the calculation measurement range 340 is defined through the discard measurement range 330, and is the range used by the acquisition device 120 for calculating the mean grain flake thickness value 300. The mean grain flake thickness value 300 is a mean of the values obtained for different calculation measurement ranges.

Figure 2:
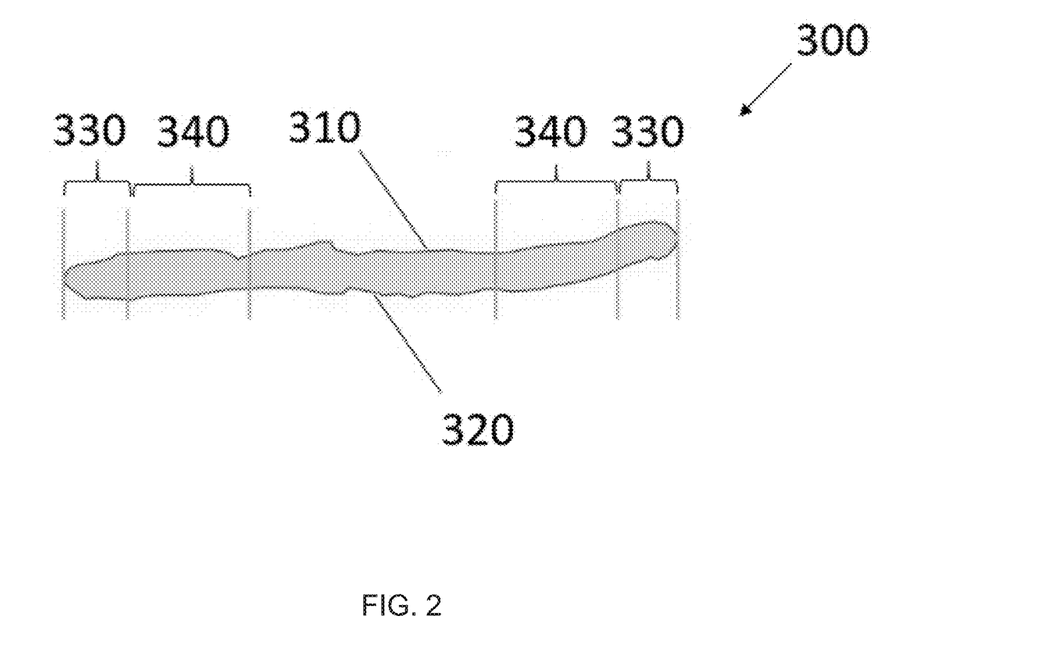
FIG. 2—is an illustration of a collected image in one embodiment of the grain flake measurement system addressed by this invention.

The length of the discard measurement range 330 and the length of the calculation measurement range 340 may vary, depending on the conditions, needs, and purposes for the use of the grain flake measurement system 100. The length of the discard measurement range 330 may be, for example, between 5% and 15% of the longitudinal length of the grain flake profile surface 300. The length of the calculation measurement range 340 may be, for example, between 15% and 35% of the longitudinal length of the grain flake profile surface 300. In one embodiment, the length of the discard measurement range 330 is 10% of the longitudinal length of the grain flake profile surface 300, and the length of the calculation measurement range 340 is 25% of the longitudinal length of the grain flake profile surface 300.

These analyses and calculations performed by the programmed tasks in the acquisition unit 120 result in grain flake measurements that are more accurate and efficient, when compared to the measurements known at the prior art.

Figure 3:
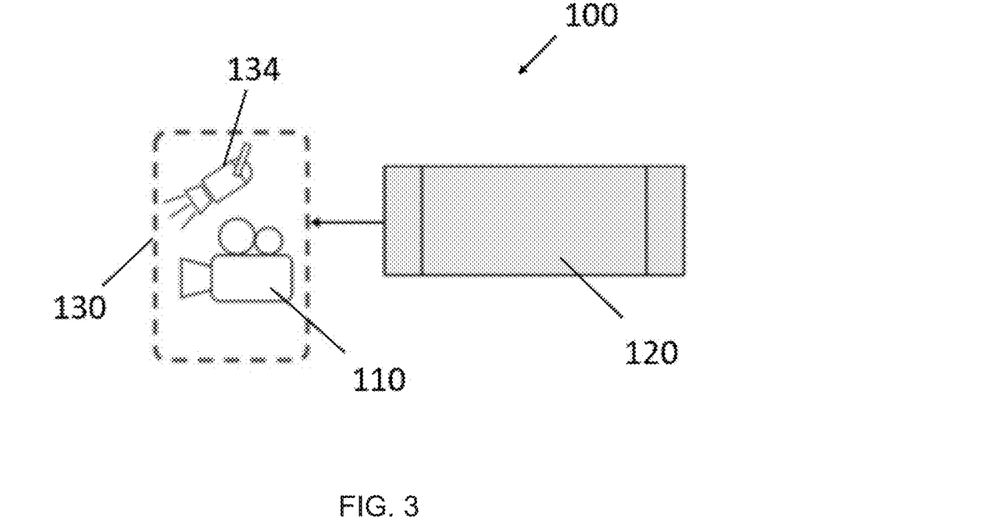
FIG. 3—is a schematic diagram another embodiment of the grain flake measurement system addressed by this invention.

Another example of an embodiment of the grain flake measurement system 100 addressed by this invention is shown in FIG. 3. In this embodiment, the grain flake measurement system 100 comprises a measurement device 130 comprises the image collection device 110. In addition to the image collection device 110, the measurement device 130 may comprise a plurality of cameras and lenses, and an internal lighting device 134.

In one embodiment of the grain flake measurement system 100 comprises the plurality of cameras and lenses, the measurement device 130 can capture images of the grain flake from different angles and/or capture images of the grain flake for purposes additional to those already described. Images of the grain flake taken from different angles on the same horizontal plane may result in more accurate measurements and endow the measurement system with additional advantages. Furthermore, cameras that capture light outside the visible spectrum may also be used, not being limited to one specific type of camera.

The internal lighting device 134 for the system 100 is any light source that can provide adequate lighting of the grain flake while the image is being captured by the image collection device 110. With regard to its positioning on the measurement device 130, the lighting device 134 is positioned in a manner that allows correct lighting of the grain flake while the image is being captured.

The lighting device 134 may be a primary light source, such as a lightbulb, for example, or a secondary light source. Furthermore, the lighting device 134 may be controlled by the acquisition unit 120 or alternatively by another means of control implemented in the grain flake measurement system 100 addressed by this invention.

Figure 4:
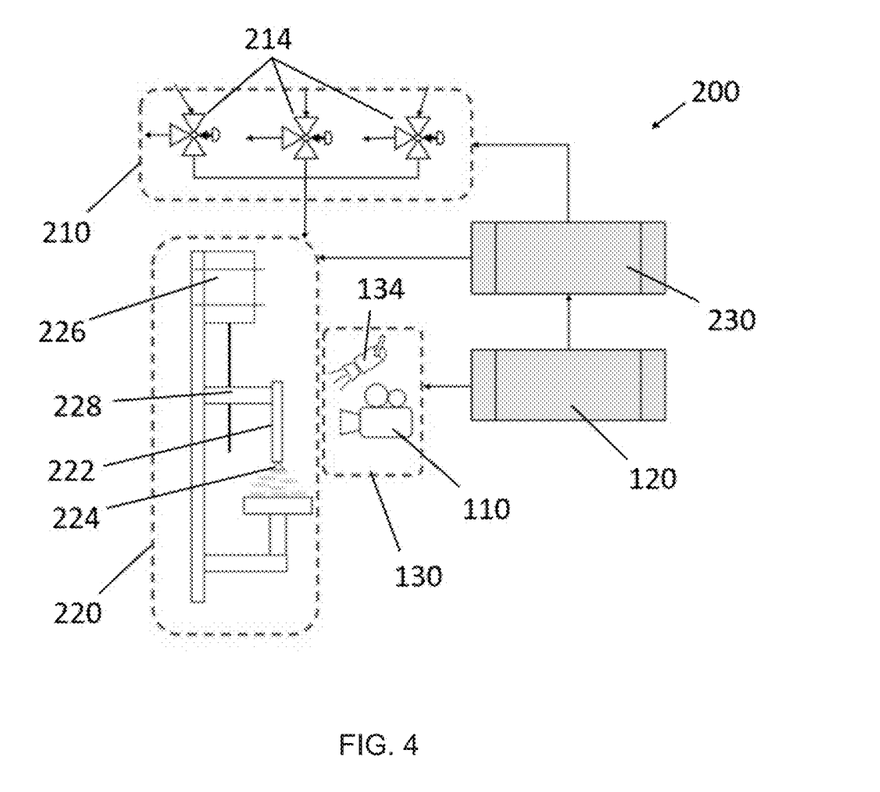
FIG. 4—is a schematic diagram of an embodiment of the grain flake collection, movement, and measurement system addressed by this invention.

FIG. 4 shows a schematic diagram of the grain flake collection, movement, and measurement system 200 according to an embodiment of this invention. In this embodiment, as shown in FIG. 4, the grain flake collection, movement, and measurement system 200 comprises the grain flake measurement system 100.

Consequently, the characteristics already described for the grain flake measurement system 100 comprised of the grain flake collection, movement, and measurement system 200 addressed by this invention. Furthermore, additional, complementary, and/or alternative characteristics are also present in the grain flake collection, movement, and measurement system 200, whereby the linking, connection, and interaction of the devices leads to the above-mentioned objectives.

In one embodiment, the grain flake collection, movement, and measurement system 200 comprises, in addition to the acquisition unit 120 and the measurement device 130, a grain flake collection device 210, a movement and selection device 220, and a command unit 230. In this embodiment, the acquisition unit 120, the grain flake collection device 210, and the movement and selection device 220 are connected to the command unit 230, whereby the command unit 230 controls the operation of these elements.

The control performed by the command unit 230 is handled through signal transmissions on physical remote connections, not being limited to any specific signal transmission type.

Similar to the acquisition unit 120, the command unit 230 comprises elements that allow the receipt of information from items of equipment, controlled or not by the command unit 230, processing the received information, analyzing the information through programmed instructions, and forwarding the information to other items of equipment.

The elements that may comprise the command unit 230 include a programmable logic controller (PLC), electronic boards, relay cards, and a power source, among others. The command unit 230 also comprises a set of executable instructions controlling the acquisition, handling, control, redirection, and/or modification of the received information.

The grain flake collection device 210 is the device that removes a grain flake from an external flow of grain flakes. The external flow of grain flakes is a flow that originated in external systems for devices, adapted or not to interact with the grain flake collection, movement, and measurement system 200. To do so, in one embodiment, the grain flake collection device 210 comprises a set of piping with at least one valve 214 configured to remove a grain flake from an external flow of grain flakes. At least one valve 214 is an asymmetrical valve 214 configured to divert grain flakes from the external flow to the grain flake collection, movement, and measurement system 200 and direct the grain flakes to the movement and selection device 220. This directing may occur through gravity, for example.

In one embodiment, the piping of the grain flake collection device 210 comprises three asymmetrical valves 214. However, the grain flake collection device 210 is not limited to this number and type of valve, and may operate with different configurations that allow the external flow of grains to be diverted into the grain flake collection, movement, and measurement system 200.

The movement and selection device 220 is the device that takes the grain flakes from the collection device and positions the grain flakes in alignment with the image collection device 110, so that the grain flake images can be collected.

In one embodiment, the movement and selection device 220 comprises a vacuum valve 222, a suction cup 224, a pneumatic linear actuator 226, and an axle with a linear guide 228. The vacuum valve 222 and the suction cup 224 of the movement and selection device 220 are configured to take the grain flake and position it on the measurement point. The suction cup 224 interacts with the grain flake, while the vacuum valve 222 creates a difference in pressure that allows the suction cup 224 to hold the grain flake. In order to move the grain flake and position it on the measurement point, the pneumatic linear actuator 226 moves the vacuum valve 222 and the suction cup 224 along the axle with a linear guide 228.

Other ways of interacting with the grain flakes are also possible, with the manner in which the grain flakes are taken not being limited to the use of the vacuum valve 222 and suction cup 224. Similarly, the grain flake movement is not limited to the use of the pneumatic linear actuator 226 and axle with a linear guide 228.

Figure 5:
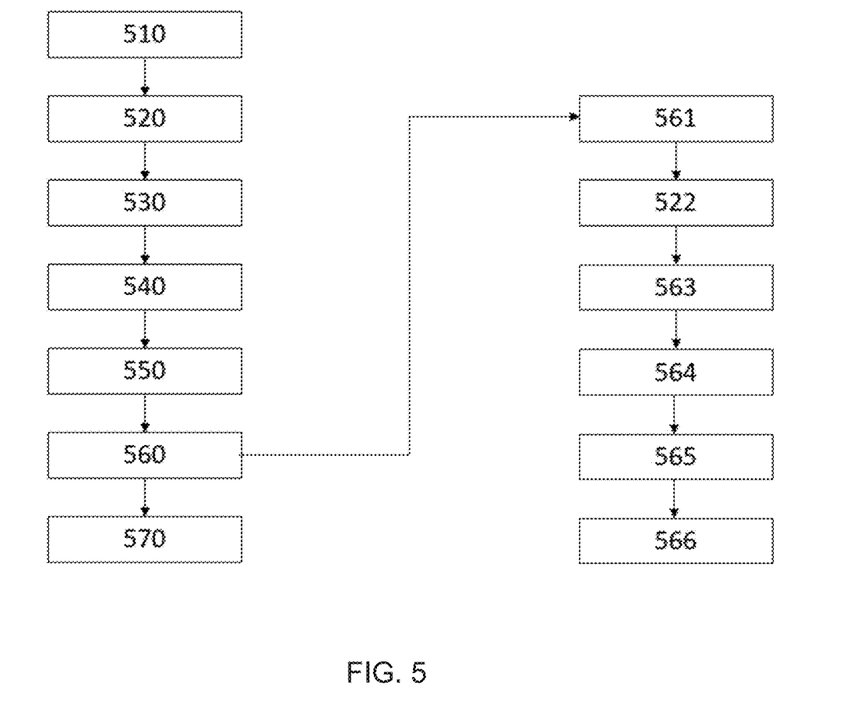
FIG. 5—is a sequence of steps for an embodiment of the grain flake measurement method addressed by this invention.

FIG. 5 shows a grain flake measurement method according to an embodiment of this invention. In this embodiment, the sequence of steps begins with a step of removing 510 at least one grain flake from the external flow of grain flakes through the grain flake collection device. The removal of the grain flake may occur, for example, through the asymmetrical valves on the grain flake collection device piping. Alternatively, a step of removing 510 at least one grain flake may remove three grain flakes from the external flow of grain flakes.

In one embodiment, after the removal of the grain flake sample from the external flow, the grain flake is directed to the movement and selection device. Next comes a step of taking 520 the grain flake through the suction cup and the vacuum valve. Taking the grain flake, the movement and selection device performs a step of moving 530 the grain flake, through the pneumatic linear actuator and the axle with a linear guide, to the measurement point. At this moment, the grain flake collection device performs a step of interrupting 540 the removal of the grain flake from the external flow.

In one embodiment, as the grain flake is positioned on the measurement point, a step of aligning 550 the image collection device with the point is performed, for measuring in a manner that avoids an upper surface and a lower surface of the grain flake being misconstrued as part of the grain flake thickness to be measured. In this case, an example of alignment would be the alignment of the image collection device with a horizontal plane of the grain flake.

A step of collecting 560 a grain flake image through the image collection device is performed when the grain flake is positioned on the measurement point by the movement and selection device. The images are collected by the image collection device, which may be a camera, for example, whereby the image collection device can collect, store, and/or send images to the acquisition unit.

After the image is collected, the movement and selection device performs a step of returning 570 the grain flake to the processes that occur in or in addition to the measurement method.

The image collected by the image collection device acquisition unit, where additional steps will be performed. In one embodiment, a step of measuring 561 the grain flake thickness takes place in the acquisition unit through the collected image. This step of measuring 561 the grain flake thickness is performed by a color segmentation process and a binary image edge segment topological structural analysis of the image of the collected grain flake. The color segmentation of the collected grain flake image may be, for example, a color segmentation in the HSV space.

The grain flake measurement method may also comprise a step of obtaining 562 a pixel per millimeter ratio pics of the image to be collected by the image collection device. This ratio may be obtained by using an object whose dimensions are known, which allows the number of pixels occupied by the object whose dimensions are known to be related to the size of the object. This step of obtaining 562 a pixel per millimeter ratio is a grain flake collection, movement, and measurement calibration system, and is performed only occasionally, as it is not a necessary step for obtaining the grain flake thickness.

In one embodiment of the measurement method, the acquisition unit performs a step of obtaining 563 a number of grain flake thickness pixels at all points forming a grain flake contour through the part and the little part corresponding to the horizontal plane of the grain flake.

Having obtained the pixel per millimeter ratio of the image to be collected and the number of grain flake thickness pixels at all points forming a grain flake contour, the acquisition unit performs a step of comparing 564 the number of grain flake thickness pixels with the pixel per millimeter ratio and defining the grain flake thickness over its entire surface profile In one embodiment, in addition to obtaining the grain flake thickness over its entire profile surface, the measurement method may also calculate the grain flake thickness measurement, based on a mean grain flake thickness value, as described below. The acquisition device performs a step of measuring 565 a discard measurement range and a calculation measurement range.

The discard measurement range is a measurement used to define the start of the calculation measurement range, and the calculation measurement range is defined through the discard measurement range. The calculation measurement range is the range used by the acquisition device for calculating the mean grain flake thickness value.

The length of the discard measurement range and the length of the calculation measurement range may vary, depending on user needs and the conditions of the grain flake measurement system. The length of the discard measurement range may be, for example, between 5% and 15% of the longitudinal length of the grain flake profile surface. The length of the calculation measurement range may be, for example, between 15% and 35% of the longitudinal length of the grain flake profile surface.

In one embodiment, the length of the discard measurement range is 10% of the longitudinal length of the grain flake profile surface, and the length of the calculation measurement range is 25% of the longitudinal length of the grain flake profile surface.

Finally, the acquisition device performs a step of calculating 566 the mean grain flake thickness value, with the values used to calculate the mean grain flake thickness being the values obtained for the different calculation measurement ranges.

Having described an example of an embodiment, it must be understood that the scope of this invention encompasses other possible variations, being limited only by the content of the Claims appended hereto, with possible equivalents included therein.

The invention claimed is:

1. A grain flake measurement system comprising:
an image collection device configured to collect an image of a grain flake; and
an acquisition unit configured to receive the grain flake image collected by the image collection device and perform a measurement of the grain flake thickness, based on a color segmentation in the HSV space and a binary image edge segment topological structural analysis of the collected image, wherein the acquisition unit is further configured to measure a discard measurement range and a calculation measurement range from the grain flake, wherein the discard measurement range is defined based on an end of the grain flake profile surface, and the calculation measurement range is defined from the discard measurement range, wherein the acquisition unit is further configured to calculate a grain flake thickness mean value, wherein the mean value is a mean of the values obtained for different calculation measurement ranges.

2. The grain flake measurement system, according to claim 1, further comprising a measurement point where the grain flake is positioned when the image collection device collects the grain flake image, wherein the image collection device is aligned with a horizontal plane of the grain flake.

3. The grain flake measurement system, according to claim 1, wherein the acquisition unit is configured to obtain a pixel per millimeter ratio of the image to be collected by the image collection device.

4. The grain flake measurement system, according to Claim 1, wherein the acquisition unit is configured to obtain a number of grain flake thickness pixels at all points forming a grain flake contour through the upper surface and the lower surface of the grain flake.

5. The grain flake measurement system, according to claim 4, wherein the acquisition unit is configured to compare the number of grain flake thickness pixels with the pixel per millimeter ratio and defining the grain flake thickness over its entire surface profile.

6. A method for measuring a grain flake, comprising the steps of:
collecting a grain flake image through an image collection device;
measuring the grain flake thickness from the collected image, wherein the step of measuring the grain flake thickness is performed by a color segmentation process in the HSV space and a binary image edge segment topological structural analysis of the image of the collected grain flake, and by measuring a discard measurement range and a calculation measurement range, wherein the discard measurement range is defined based on an end of the grain flake profile surface, and the calculation measurement range is defined from the discard measurement range; and calculating a grain flake thickness mean value, wherein the mean value is a mean of the values obtained for different calculation measurement ranges.

7. The method for measuring a grain flake, according to claims 6, further comprising a step of aligning the image collection device with a measurement point in a manner that avoids an upper surface and a lower surface of the grain flake being misconstrued as part of the grain flake thickness to be measured.

8. The method for measuring a grain flake, according to claim 6, further comprising a step of obtaining a pixel per millimeter ratio of the image to be collected by the image collection device.

9. The method for measuring a grain flake, according to claim 6, further comprising a step of obtaining a number of grain flake thickness pixels at all points forming a grain flake contour through the upper surface and lower surface of the grain flake.

10. The method for measuring a grain flake, according to claim 9, further comprising a step of comparing the number of grain flake thickness pixels with the pixel per millimeter ratio and defining the grain flake thickness over its entire surface profile.

11. The method for measuring a grain flake, according to claim 6, wherein the length of the discard measurement range is between 5% and 15% of the longitudinal length of the flake profile surface, and the length of the calculation measurement range is between 15% and 35% of the longitudinal length of the flake profile surface.

12. A grain flake collection, movement, and measurement system, comprising:
a grain flake collection device that comprises at least one valve configured to remove a grain flake from an external flow of grain flakes;

a measurement device that comprises an image collection device configured to collect a grain flake image for analysis;

a movement and selection device configured to take the grain flakes from the collection device and position the grain flakes at a measurement point;

an acquisition unit configured to receive the grain flake image collected by the measurement device and perform a measurement of the grain flake thickness, wherein the acquisition unit is further configured to measure a discard measurement range and a calculation measurement range from the grain flake, wherein the discard measurement range is defined based on an end of the grain flake profile surface, and the calculation measurement range is defined from the discard measurement range, wherein the acquisition unit is further configured to calculate a grain flake thickness mean value, wherein the mean value is a mean of the values obtained for different calculation measurement ranges; and a command unit connected to the grain flake collection device, the movement and selection device, and the acquisition unit, in a manner whereby it controls them.

13. The grain flake collection, movement, and measurement system, according to claim 12, wherein the measurement of the grain flake thickness is performed based on a color segmentation in the HSV space and a binary image edge segment topological structural analysis of the image of the plurality of grains collected.

14. The grain flake collection, movement, and measurement system, according to claim 12, wherein the grain flake collection device comprises a set of piping with asymmetrical valves configured to direct the external flow of grain flakes to the grain flake collection, movement, and measurement system.

15. The grain flake collection, movement, and measurement system, according to claim 12, wherein the movement and selection device comprises a vacuum valve, a suction cup, a pneumatic linear actuator and an axle with a linear guide, wherein the vacuum valve and the suction cup are configured to take the grain flakes, and the pneumatic linear actuator moves the vacuum valve and the suction cup along the axle with a linear guide.

* * * * *